J. HUTCHINGS.
ROCK DRILL OR BORING TOOL.
APPLICATION FILED MAR. 6, 1908.
931,611.
Patented Aug. 17, 1909.
5 SHEETS—SHEET 4.
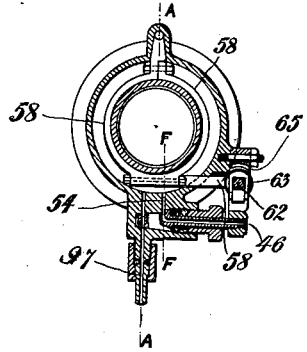
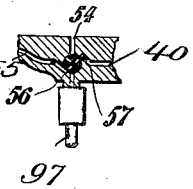
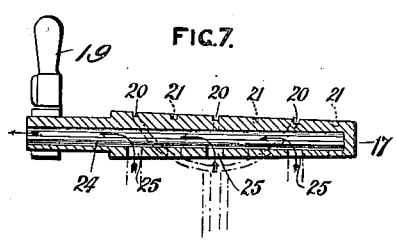
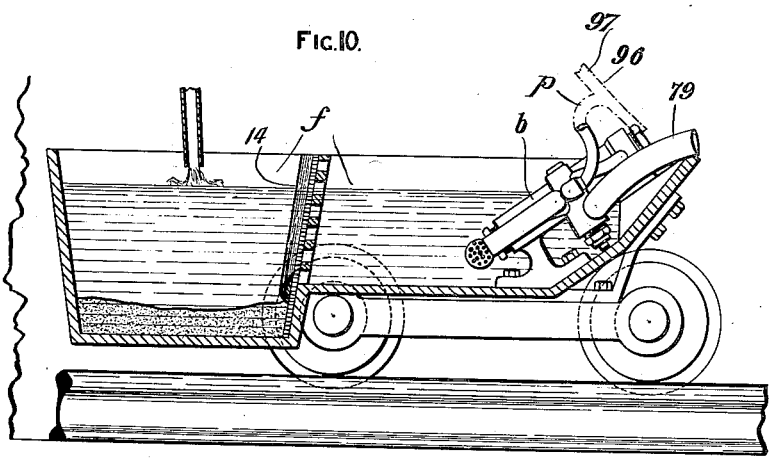
Witnesses:
Inventor
John Hutchings
By
James L. Norris

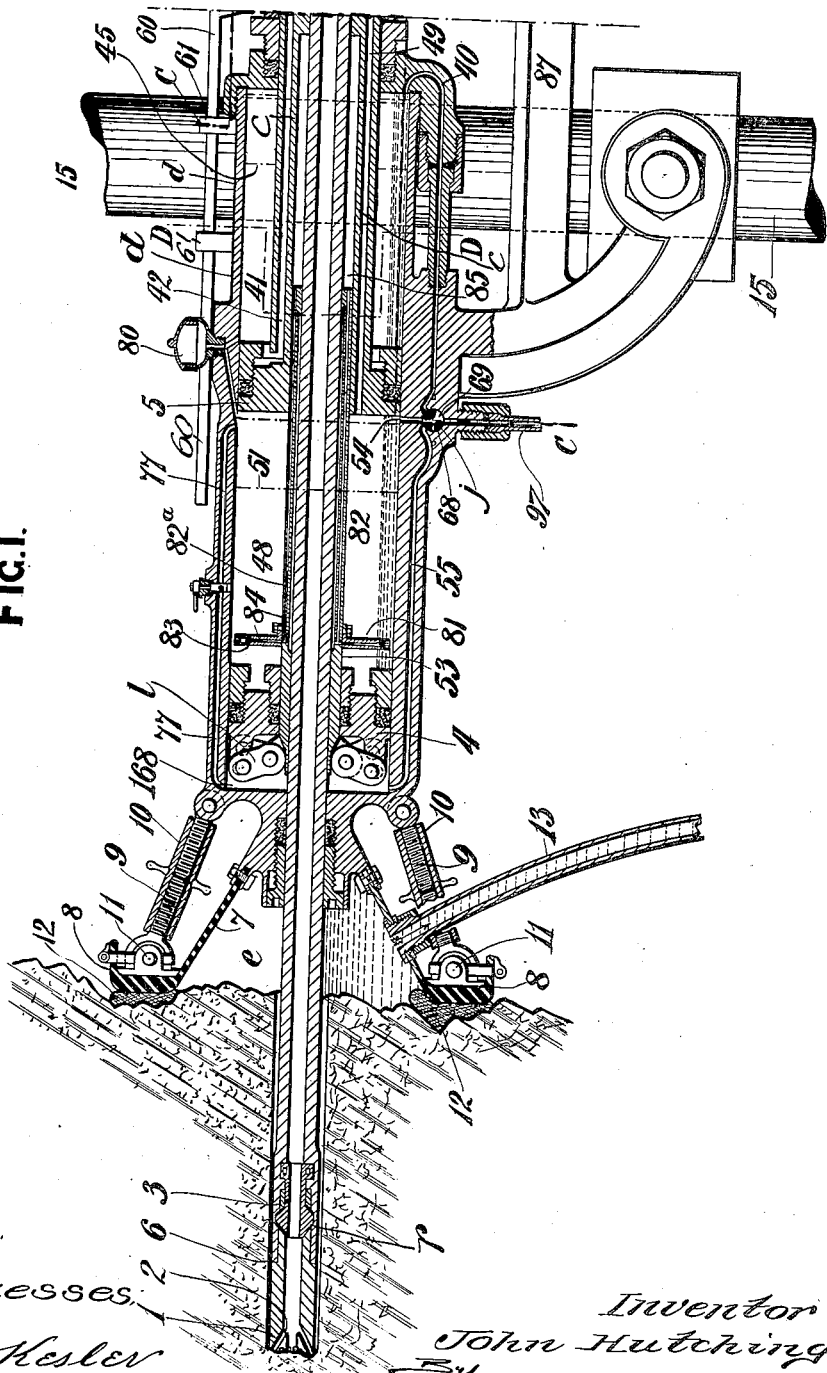

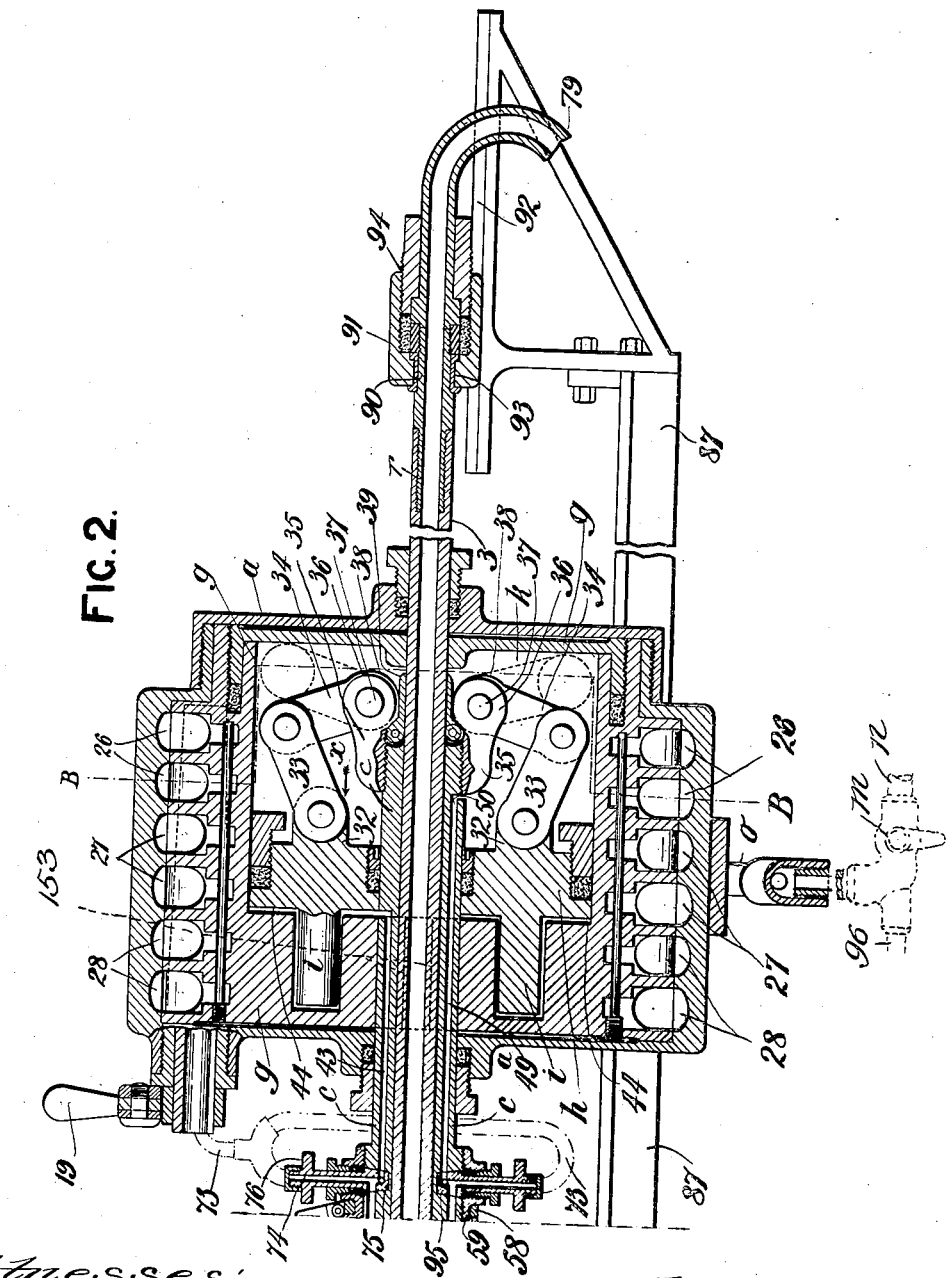

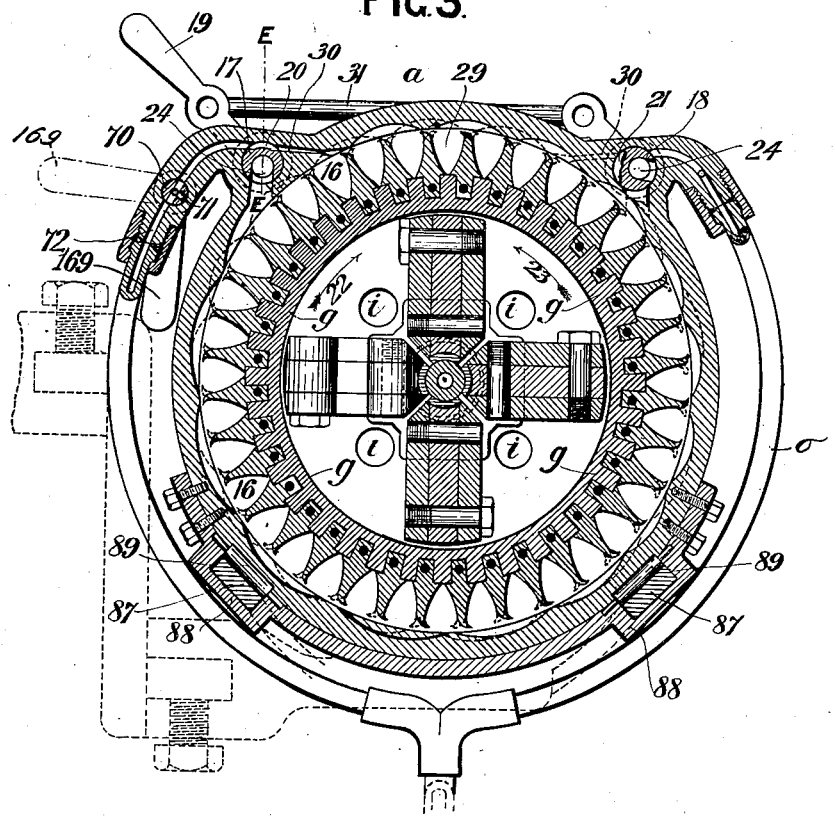

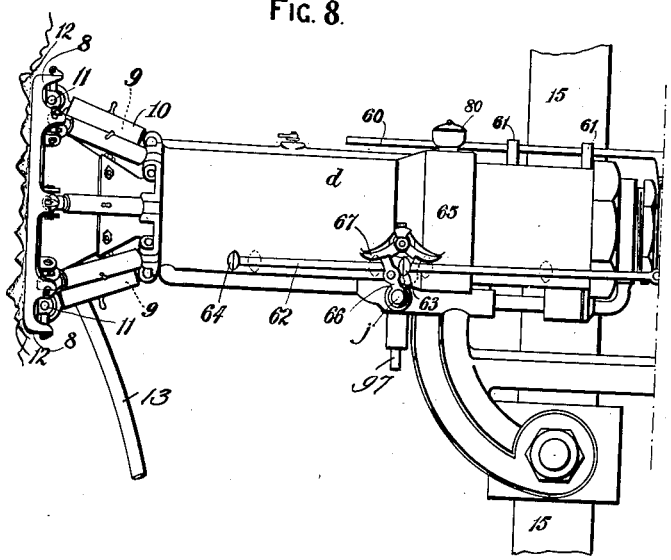
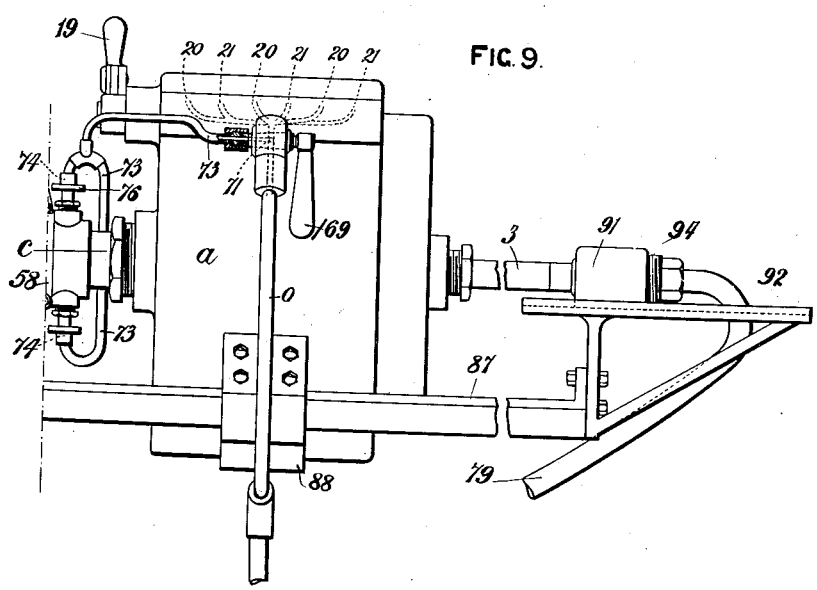

UNITED STATES PATENT OFFICE.

JOHN HUTCHINGS, OF LONDON, ENGLAND.

ROCK-DRILL OR BORING-TOOL.

No. 931,611.        Specification of Letters Patent.        Patented Aug. 17, 1909.

Application filed March 6, 1908. Serial No. 419,490.

*To all whom it may concern:*

Be it known that I, JOHN HUTCHINGS, a subject of the King of Great Britain, residing at Capel House, 62 New Broad street, in the city of London, England, mechanical and mining engineer, have invented certain new and useful Improvements in and Relating to Rock-Drills or Boring-Tools, of which the following is a specification.

This invention relates to rock-drills and tools of analogous nature for boring rock stone and other substances.

*Description of the drawings:—*

Figure 1 illustrates by a vertical longitudinal section, taken on the line A. A. Fig. 4, the left hand half of the machine. Fig. 2 is a similar view to the preceding figure showing the right hand half of the drill mechanism. Fig. 3 is a cross section taken on the line B. B, Fig. 2. Fig. 4 is an irregular cross section taken on the line C. C. Fig. 1. Fig. 5 is a section taken on the line D. D. Fig. 1. Fig. 6 is a section taken on the line F. F. Fig. 4. Fig. 7 is a longitudinal section of one of the valves 17 or 18 taken on the line E. E. Fig. 3 which valves serve to regulate and control the inlet, exhaust and transmission of the motive fluid to and from the various passages and rotor chamber. Fig. 8 shows an outside view of the left portion and Fig. 9 a like view of the right hand portion of the machine and Fig. 10 shows by a view (partly in section) the settling tank, filter and pump.

The improved power driven boring tool as illustrated is driven by means of compressed air acting upon a turbine, mounted directly, or supported on, the axis of the tool, or at the side thereof and when supported at the side it is geared to the tool holder by means of suitable pinions and tooth-wheels or equivalent driving connection of any usual or convenient character (not shown) but the particular fluid employed may be varied according to the requirements of the case.

The boring-bit is formed with passages 2, 2, for water and the bit-holder, or drill 3 is similarly provided with means for keeping the bit 1 supplied with water led thereto by means of a pipe 79 and force pump *b* (Fig. 10) of a type adapted to insure a constant pressure, or head, or where circumstances are favorable a natural head may be utilized. Around the drill holder *c* is arranged a cylinder *d* with piston, or pistons 4, 5, connected to the drill holder 3. This cylinder *d* is supplied with air under suitable pressure, so that the pistons 4, 5, act to press the tool 3 constantly to its work, and conversely when required to withdraw the tool from its work. The water referred to, after passing through the apertures 2, 2, in the bit 1 escapes between the bit and the work through the usual grooves 6, into the chamber *e*, which, as described hereafter, is flexible and contains water into which the sludge formed by the drill lodges, this water, thus capturing the borings, grit and dust, preventing their escape to the injury of the operator, or others, as is well understood, but instead of this escaping liquid matter being free to flow away by gravity, it is confined in a limited area or chamber *e* formed by a conical, or domed, or similar inclosing flexible covering 7, around the tool bit-holder and over the tool and the entrance to the hole bored. This flexible covering 7 consists of a conical sheet of india rubber, gutta percha, strong water-proof canvas, hide, leather, or other suitable substitute, for the rubber, with a strengthened tip, mouth edge or rim 8, where it takes a sucker-like hold upon or forms a close packing joint with the surface of the rock or material being drilled or bored:—the object being to attain a limpet-like or sucker-connection to confine the liquid with the pyramidical inclosure; but as the pressure is in the outward direction the lip of the flexible sheet is kept tight by mechanical means, such as right and left handed screws 9, 9, adjustable screwed coupling 10 fitted thereon, and joints 11, or this may be effected by the air pressure referred to. This air-pressure in the cylinder chambers 41, 48 must be sufficient on that account, to overcome any tendency of the water to lift the tool away from its work.

The pressure of the air piston may be conveyed to the lip of the flexible chamber, by means of a series of hinged, or centered, or knuckle ended arms, or thrust pieces 11, having feet, or pressure plates, which to obtain a swiveling or like action to their foot parts would be similarly universally jointed or socketed on to their holders or arms as shown. The lengths of the arms or holders are also made variable by the introduction of screws as previously described, or like adjusting devices in the arms or holders.

These parts of the flexible inclosure are thus held practically liquid tight, to the fixed surface around the work hole and escape of sludge or water is prevented, except into tank *f*. The lower end of the drill tool cylinder *d* and the packed parts around the hole being drilled are kept in relative adjusted position throughout the operation by said arms which take their abutment against the cylinder connected to the air forcing piston and any roughness of the rock may be packed tight by wedges 12 of rubber or like elastic material.

The area within the flexible wall of the chamber *e* is in controlled connection, by a flexible pipe 13 with a settling vessel, or tank *f*, (preferably capable of locomotion as on rails, or trams) thereby serving as a traveling conveyance for removing the captured dust and sludge without risk of its causing injury to the lungs of the operator. At the same time this captured sample of reduced rock, or material drilled can be utilized for purposes of analysis, or after settlement of the heavier portions, the supernatant water may be drawn off through perforated screens and other usual filtering media 14 for reuse in the drill-bore under the suction of the force pump *b*; which pump *b* may be of any suitable character dependent upon the description of the strata, or the situation of the work; unless the natural situation enabled a head of water to be utilized to afford the pressure.

The drill is supported, or held in its working position in the usual manner, as by a post 15, fixed to the sides, or roof and floor of the drive, tunnel or stope and capable of adjustment to a vertical, horizontal or any intermediate position.

The drill is actuated by compressed air admitted to the vanes, or blades of the turbine *g* by one of the valves 17, 18 operated by the lever 19. These valves 17, 18 are connected together by the rod 31 so that they move in unison. When the lever 19 is in the position shown in Fig. 3, motive fluid is admitted to the turbine through the valve 17, but the inlet passages 21 of the valve 18 are closed and the turbine will rotate in the direction of the arrow 22, if the lever 19 is moved to the right, then the inlet passages 20 are closed and the inlet passages 21 are opened causing the turbine to rotate in the opposite direction, that is to say, in the direction of the arrow 23. These valves 17, 18 are provided with exhaust passages 24 and 25 so arranged and positioned that when the inlet passages 20 are open their corresponding exhaust passages 24, 25 are also open, the exhaust passages being sufficiently large to allow the expanded air to escape, freely to the atmosphere, after the completion of the cycle.

The motive fluid is introduced to the turbine chamber by way of a passage 30, the flow through which is controlled by means of a valve 17, on the left hand side or 18 on the opposite side, the plug of which is of coned form, the inlet passage 30 being partly formed through grooves 20 in the upper exterior surface of the plug (17 or 18) while vertical openings 25 in the lower exterior portion of the plug communicate with a horizontal passage 24 therein, arranged somewhat eccentrically of a line drawn centrally of said plug. By these means the fluid passes over the plug to and around the rotor *g* back to and through said plug 17 and 18, and by these means one turning movement serves to open and cut off the passages for inlet and exhaust.

The rotor chambers 26, 27 and 28, are arranged in series and are each supplied with motive fluid by a series of inlet passages 30 passing through a series of grooves 20 arranged in steps upon the same plug and the respective outlets are arranged to communicate with a common exhaust, or when the engine is worked expansively the respective rotors 26, 27, 28 of the series are supplied with fluid by means of the first passage of supply and exhausted by the first outlet of the series, the fluid then expanding into the second outlet and so on through the series in each case after exerting energy in driving the rotors.

In the installation shown by Fig. 2 the rotor has a multiplicity of radial blades, vanes or impact surfaces, as 16, arranged around the periphery of the rotor body or cylinder as *g*. These blades or surfaces are arranged to be acted upon individually and independently by the fluid, or in sequence, as explained when the fluid is caused to flow first into one and thence to another of the series and these blades are arranged so as to be usable in two sets for purposes of reversal of direction of rotation, *i. e.* in the direction of the arrow 22 and the other for movement in the direction, as indicated by the arrow 23.

The driving connection between the drill-tool-holder spindle and the turbine mounted directly on the same, is effected by means of a prolonged pinion or barrel 53 having longitudinal ribs 52 thereon which coöperate with and drive a correspondingly internally formed pinion or barrel 85 forming part of or connected to the drill-tool-holder *c*. The drill-holder *c* lies within the cylinder *d* which cylinder contains the pistons which are connected to said holder by intermittent connection here shown as a clutch connection. The drill spindle incased by sleeve or holder *c* is keyed as at 153 to the turbine, or rotor *g* and the piston slide or clutch *h* is connected to the rotor by means of the pins or teeth *i* of a gear or pinion forming the front face of the sliding part *h*. Projecting rearwardly from the piston like slide r are lugs 32,—32 and these lugs are connected to the collar 35 by pairs of toggle links 33—34 attached to the lug 36 by pins 37. The portions 38,—38, of the links 34 are formed as cams and in the rotation of those links on the pins 37 the cams 38 are caused to grip the concave shoes 39 connected to the rear end of the drill-holder c and the pressure clamps the shoes 39 on the drill 3 causing the parts c and 3 to be as connected by said shoes as to move as one piece. The rearward motion of the piston h and this gripping action of the parts 38 on the drill 3 is brought about by the expansive force of the compressed air supplied through the valve j, the passage 40, space 41 in the cylinder, passages 42, 43, to the space 44 in front of the piston h which it causes to move rearwardly and exercise through the interposed levers, this gripping action.

As shown in Fig. 1 while on the one hand the piston 5 is shown in full lines advanced to its forward position toward the center of the cylinder d, on the other hand the piston 4 as there shown, has not yet taken up its corresponding position that is to say a position which would bring its rear face to about the dotted line 51 although in fact the movement of the piston 4 to about the position indicated by the dotted line 51 would be simultaneous with the corresponding change of position of the piston 5, already referred to, from the position indicated by dotted lines 45 to the full line position. At the same time the pressure of the air or other motive fluid is acting on the right hand side of the piston 5 when it is in the position indicated by the dotted lines 45 and as this piston 5 is formed integrally with the drill holder c and the latter firmly clutched to the drill 3, by the clutch previously described, the air pressure on this piston keeps the drill-bit in constant pressing engagement with the material to be bored; until the piston arrives at the position, as indicated by full lines (Fig. 1); at that moment the valve j closes the inlet communication to passage 40, but establishes communication with the exhaust port 46, (Fig. 4) opening the inlet port 47, admitting air into the space 48 in the cylinder by way of the passage 54 the air then passes through the passage 49 in the drill holder c, escaping at 50 into the clutch chamber k, moving the piston h in the direction of the arrow x, releasing the clutch-cams 38 from the shoes 39. Simultaneously with this release the clutch-piston 4 (in the position indicated by the dotted lines 51) in the cylinder space 48 receives the air pressure on its right hand face and is moved forward, and by means of the clutch l, similar in construction and action to that already described, engages, or grips the drill 3. The pressure of the fluid exerted on the rear face of the piston 4 carries the drill spindle and bit forward the turbine parts giving the rotative movements, the combination thus continuing its forward movement as well as the rotary action. This rotary action of the drill while it is kept in engagement by the engagement of the clutch parts l is effected by the interlocking of the prolonged teeth or projections 52 formed on the sleeve or elongated pinion 53 with corresponding teeth between the recesses, or formed in that portion of the drill holder c (see Fig. 5).

When the piston 4 has carried the drill forward and reached the position shown by full lines in Fig. 1, the valve j is reversed and air is admitted to the front (at 168 i. e. the extreme left hand end) of the piston, 4 through the passage 55, moving the piston 4 rearward releasing the drill from engagement with the clutch l and carrying this piston, clutch and sleeve 53 to their initial position shown by the dotted lines 51, the valve j is now reversed and consequently now opening and again admitting air to the clearance space in front of the piston 5 thus completing the cycle of operations in readiness for resumption of the already described movements. The valve j is so constructed as to admit air, or other motive fluid to the parts and passages 40, 55 and at the same time allow the exhaust to escape from 54 and inversely while the exhaust is escaping through the valve passages 56, 57 the motive fluid is admitted through the port 54 (shown in Fig. 1).

The action of the valve j is as follows:— The valve rod strap 58 is loosely attached to the drill holder c by the collar 59 and travels therewith, the guide 60 sliding in the bearings 61, formed on the cylinder d, preventing rotary motion of the valve rod 62. Assuming the piston 5 to be in the position indicated in Fig. 1 and the piston 4 to have taken up its corresponding position on line 51 the valve rod 62 and its circular or domed cam like actuating faces 63, 64, which serve to move the parts 65, 66, and 67 will have traveled to the position indicated by full lines, the actuating face 63 having lifted and released the latch 65 at the same time releases the valve lever 66 from engagement with this latch moving it into engagement with the latch 67 rotating the valve j closing communication between the passages 68 and 69 in this valve and the ports 55 and 40 in the cylinder d respectively, and at the same time opening communication between the valve j and passage 54 and the cylinder space 48 moving the piston 4 from the dotted line position 51 to the full line position shown and the piston 5 from the full line position shown to the dotted line position indicated by the dotted line 45 to the left and right hand ends of the cylinder d respectively, as previously described. This movement of these parts at the same time brings the exhaust passages 56 and 57 into position relatively to the exhaust outlets that the exhaust fluid is free to escape from the portions of the cylinder to the left of piston 4 and right of piston 5.

By reason of the connection of the piston 5 to the drill holder c and of this latter with the strap 58 and rod 62 those parts will travel in unison; just previous to the completion of the return stroke the actuating face 64 on this rod will come into lifting engagement with the latch 67 releasing the valve-lever 66 from engagement with it and pull it over into engagement with the latch 65 bringing the passages 68 and 69 of the valve j into communication with the passages 40 and 55 in the cylinder d admitting fluid to cylinder spaces 41 and 168 for the forward stroke of the pistons 4 and 5.

When it is required to withdraw the drill from the hole bored the lever 19 is moved to occupy the position indicated in Fig. 3 so as to close valve 18, the lever 169 actuating the valve 70 being brought into the position for closing the passage of air through the passages 20 to the rotor causing the drill to cease work.

The flexible pipe 73 is connected to the unions 74 of the valves 75. These valves 75 have milled or roughened flanges 76 and pointers or indicators are attached thereto to indicate the position of the ports therein and so facilitate their being turned by hand to cut off passage 42 and open communication between the pipe 73 and the passage 43. The lever 169 is moved to the proper position for placing the passages of pipes 72, 73 and 74 in communication one with the other, so as to admit motive fluid to the passages 74 in the valve 75, and thence to the passage 43 leading to the space 44, thereby actuating piston h and cutting off communication of air between passage 43 and space 44 and passage 42 leading to cylinder 41, locking the clutch into operative connection with the drill 3. Immediately the clutch 38 comes into operation the air acting on the left hand faces of the pistons 4 and 5 moves them rearward causing the drill 3 to be withdrawn. The pressure on these two pistons 4 and 5 is equalized by air being admitted from the cylinder space 48 through valve controlled passage 77 allowing the piston 5 to move to the rear extent of its stroke while its return is effected by the cutting off air from the cylinder space 48 and the opening of the exhaust port 46 to allow of the recession of the piston accelerated by the influx of air through the inlet valve of channel 40. The clutch 38 is released from the drill-holder 3 to allow of the piston 5 moving forward, carrying with the clutch in open position ready, when it reaches the forward end of its stroke, to take a fresh grip for withdrawing the drill. This clutch releasing movement when withdrawing the drill is effected by the operation of the valve 95 so as to allow of the influx of air through the pipe 73 and channel 49$^a$ to the clutch chamber in front of the piston h performing the reverse function to that performed by valve 75. This operation is repeated as often as is necessary until the drill is completely withdrawn from the bore.

Lubrication is effected by admission of oil from the oil cup 80 to the cylinder d, whence oil flows to the bottom of the cylinder as shown. A disk 81 affixed to the sleeve 82 is drilled and provided with ball valves 83 to admit oil when a suction is created in the passages 84 by the withdrawal of the sleeve 82 from its casing 85 formed in the drill holder c; on the return of this sleeve the oil and air in 85 escape through the top passages 84 into the cylinder 48. On the movement of the pistons 4 and 5 the oil is gradually expelled through the exhaust valve channels 54, 69 and through 46 to a receiver (not shown).

The turbine, or other rotor casing a is kept in working position by guiding rails 87 and guides 88; friction rollers 89 being interposed between the rails 87 and the casing a of the turbine. This arrangement allows the turbine to reciprocate to and fro on the said rails 87 as it is drawn to and fro by the piston 5.

The outer end 90 of the drill 3 is supported by a cradle 91 (with capability of longitudinal movement) carried on guideways 92 formed integrally with or bolted to (as shown) the guide rails 87. A bearing 93 is formed in the cradle 91 to take this rotating part 90 of the bit holder 3. The outer end 94 of the cradle 91 is constructed as shown so as to form a water tight joint between the end of the drill and its flexible water carrying pipe 79 supplied from any suitable low level or overhead reservoir, or forcing station. n is a source of supply (here shown as a pipe) which pipe leads to any suitable reservoir of air under compression, or of other suitable motive fluid. This pipe is connected by means of a cock or valve m and a pipe o to the chambers such as 28, the pipe 73, passages 74 and 43, and space 44 the motive fluid also passes by pipe 96 to the pipe p communicating with the pump b and by pipe 97 to the valve j and thence by passages 54, 55 and 40, 42, as well as 49 and others, in order to effect the various operations of the parts of the drill, as already detailed.

Prolongation of the drill, stem, or rod, 3 as the drilled hole or bore becomes deepened, is effected by the insertion of threaded or other joints of usual or convenient character as at r, and when the rod 3 in use has arrived at the end of its reach, as it is gripped and moved forward by the clutches, this joint *r* is disconnected and the parts separated, a new section is interposed, joined up and the gripping and pressing forward resumed until the reach of the second section is taken up and so on.

Among the advantages accruing from the invention is the facility afforded for the constant maintenance of pressure upon the drill bit, or head irrespective of the particular direction in which, for the time being, it may be presented to the work, with the further advantages obvious to a practical miner, that the water is confined within prescribed channels instead of its being distributed uncontrolled over the worker to his discomfort and injury as often occurs, especially when he is operating on or near the ceiling, or crown of the drift, drive or level or in rising slopes; and by reason of the facilities afforded for the dispensing with steel cutters and the use of diamonds alone the dangers accredited to steel particles abraded during working are avoided.

The utilization of the turbine driving device to actuate the tool or rock drill-bit when the turbine or like motor wheel is of the reversible type enables the tool to be driven in either direction at will so that as soon as the diamonds or cutting faces have become worn by the continued impact on their one set of cutting faces by reversal of direction of driving the opposite cutting faces will be brought into play with enhanced effect.

I am aware that a device has been published for washing out boring spines in rotary rock drills in which the drill spindle is hollow, open ended and smooth internally, and has around it and at its rear end washers which confine the pressure water supplied by a usual pipe, to the drill to an inclosed space around the entrance to the bore and causes it to pass along the bore and around the bit into the front end of the hollow drill spindle, along the same whence it escapes at the rear end thereof, thus reversing the more usual method of forcing a current of air or water in at the back and throughout the tubular spindle to the front or bit end thereof and further that a dust strainer and arresting device for air blast drills has also been published in the form of a hollow truncated cone whose mouth opening over the mouth of the bore hole is held in position approximately near the hole in which the drill revolves, the base of the cone being faced with hair-bristles, wire cloth or the like fringe, which fringe is pressed close against the edges of the bore hole and serves by snugly fitting the mineral about the hole to, in a large measure, prevent lateral escape of dust with the air blast thus acting as a dust straining sieve and from the conical strainer the intercepted dust escapes by an orifice from which it is led by a pipe to a bucket of water or to be dry screened.

I claim as my invention:

1. In a rock drill, the combination of a drill casing, a drill spindle reciprocable with respect thereto, and pneumatically-operated means operable alternately to maintain a thrust upon the drill spindle.

2. In a rock drill, the combination of a drill casing, a drill spindle operable therein, a pair of fluid-operated pistons provided with means for connecting them to the drill spindle, and controlling means for causing alternate operation of said pistons to maintain a thrust upon the drill spindle.

3. In a rock drill, the combination of a drill casing, a drill spindle operable therein, a pair of fluid-operated elements independently movable and provided with individual clutch devices for connecting them to the drill spindle, and controlling means for causing alternate connection between said fluid-operated elements and the drill spindle.

4. In a rock drill, the combination of a drill casing, a drill spindle reciprocable therein, individually-operable clutch devices arranged to coöperate with the drill spindle, means for operating said clutch devices and for producing a thrust upon the drill spindle, and controlling means for causing alternate operation of the clutch devices.

5. In a rock drill, the combination of a drill casing, a drill spindle operable therein, a pair of independently operable feed devices for producing a thrust upon the drill spindle, controlling means for causing alternate operation of said feed devices, and means carried by one of said feed devices for imparting rotation to the drill spindle.

6. In a rock drill, the combination of a drill casing, a drill spindle operable therein, a pair of independently operable feed devices for producing a thrust upon the drill spindle, controlling means for causing alternate operation of the feed devices, and a turbine operatively connected to one of said feed devices and serving to impart rotation to the drill spindle.

7. In a rock drill, the combination of a drill casing, a drill spindle reciprocable therein, independently operable feed devices for producing a thrust upon the drill spindle, and controlling means for causing alternate operation of said feed devices whereby one may be connected to the drill spindle and the other disconnected therefrom while the drill spindle is being fed forward.

In testimony whereof I have hereunto set my hand in presence of two subscribing witnesses.

JOHN HUTCHINGS.

Witnesses:
  JOHN COODE HORE,
  ALFRED GEORGE WILLIAM BROOKES.